United States Patent
Ostojic (10) Patent No.: US 11,947,106 B2
(45) Date of Patent: Apr. 2, 2024

(54) OPTOELECTRONIC SENSOR AND METHOD OF DETECTING OBJECTS

(71) Applicant: SICK AG, Waldkirch (DE)

(72) Inventor: Oliver Ostojic, Waldkirch (DE)

(73) Assignee: SICK AG, Waldkirch (DE)

( * ) Notice: Subject to any disclaimer, the term of this patent is extended or adjusted under 35 U.S.C. 154(b) by 869 days.

(21) Appl. No.: 17/022,260

(22) Filed: Sep. 16, 2020

(65) Prior Publication Data

US 2021/0088775 A1     Mar. 25, 2021

(30) Foreign Application Priority Data

Sep. 24, 2019    (DE) .......................... 102019125684.4

(51) Int. Cl.

| | | |
|---|---|---|
| *G02B 26/08* | (2006.01) | |
| *G01S 7/481* | (2006.01) | |
| *G02B 3/12* | (2006.01) | |
| *G01S 17/02* | (2020.01) | |

(52) U.S. Cl.
CPC ........ *G02B 26/0833* (2013.01); *G01S 7/4817* (2013.01); *G02B 3/12* (2013.01); *G01S 17/02* (2013.01)

(58) Field of Classification Search
CPC .... G02B 26/0833; G02B 3/12; G02B 26/101; G01S 17/02; G01S 7/4817; G01S 7/4815; G01S 17/10; G01S 17/42
USPC ......................................................... 356/4.01
See application file for complete search history.

(56) References Cited

U.S. PATENT DOCUMENTS

| 5,151,814 A | 9/1992 | Grinberg et al. |
|---|---|---|
| 10,061,019 B1 | 8/2018 | Campbell et al. |
| 10,330,921 B2 | 6/2019 | Erlich et al. |
| 10,348,051 B1 | 7/2019 | Shah et al. |
| 2010/0020306 A1 | 1/2010 | Hall |

(Continued)

FOREIGN PATENT DOCUMENTS

| DE | 4340756 A1 | 6/1994 |
|---|---|---|
| DE | 19757849 B4 | 12/2004 |

(Continued)

OTHER PUBLICATIONS

Translation into English of description component of Nübling, DE102014118149, 22 pp. created 2023. (Year: 2023).*

(Continued)

*Primary Examiner* — Daniel L Murphy
(74) *Attorney, Agent, or Firm* — Nath, Goldberg & Meyer; Jerald L. Meyer (57) ABSTRACT

An optoelectronic sensor for detecting objects in a monitored zone is provided that has a light transmitter for transmitting at least one scanning beam, a movable first deflection unit for a periodic deflection of the scanning beam in a first direction, a light receiver for generating a received signal from the scanning beam remitted by objects in the monitored zone, and a control and evaluation unit that is configured to evaluate the received signal to determine the distance from an object scanned by the scanning beam using a time of flight process, A second deflection unit is here configured to additionally deflect the scanning beam in the first direction and/or in a second direction transverse to the first direction without a movement or at most with micromechanically moved elements.

17 Claims, 3 Drawing Sheets

(56) References Cited

U.S. PATENT DOCUMENTS

2015/0015869 A1    1/2015    Smith et al.
2019/0107607 A1    4/2019    Danziger
2019/0250254 A1    8/2019    Campbell et al.

FOREIGN PATENT DOCUMENTS

| DE | 102004014041 A1 | 10/2005 |
| DE | 102010061382 A1 | 6/2012 |
| DE | 102014118149 A1 | 6/2016 |
| EP | 1936400 A1 | 6/2008 |
| EP | 2708914 A1 | 3/2014 |
| EP | 2863176 A2 | 4/2015 |
| EP | 2894493 A1 | 7/2015 |
| EP | 3518000 A1 | 7/2019 |
| EP | 3712647 A1 | 9/2020 |

OTHER PUBLICATIONS

German Search Report dated Sep. 1, 2020 corresponding to application No. 102019125684.4.

\* cited by examiner

OPTOELECTRONIC SENSOR AND METHOD OF DETECTING OBJECTS

The invention relates to an optoelectronic sensor, in particular to a laser scanner, for detecting objects in a monitored zone that has a light transmitter for transmitting at least one scanning beam, a movable first deflection unit for a periodic deflection of the scanning beam in a first direction, a light receiver for generating a received signal from the scanning beam remitted by objects in the monitored zone, and a control and evaluation unit that is configured to evaluate the received signal to determine the distance from an object scanned by the scanning beam using a time of flight process. The invention further relates to a method for detecting objects in a monitored zone in which at least one scanning beam is transmitted; the scanning beam is periodically deflected in a first direction by means of a movable first deflection unit; a received signal is generated from the scanning beam remitted by objects in the monitored zone and the received signal is evaluated to determine the distance from an object scanned by the scanning beam by the time of light process.

In a laser scanner, a light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light in a phase method or pulse method. The location of an object in the monitored zone is detected in two-dimensional polar coordinates using the angular data and the distance data. The positions of objects can thus be determined or their contour can be determined.

The scanning movement is achieved by a rotating mirror or by a polygon mirror wheel in most laser scanners. In some laser scanners, such as that in accordance with DE 197 57 849 B4, the total measuring head with the light transmitters and light receivers rotates instead. To increase the range with a limited light pulse energy, some conventional laser scanners transmit a plurality of light pulses per distance value and offset the results of these individual measurements against one another to form a common measured value. Such a laser scanner using a pulse averaging method is known, for example, from DE 10 2010 061 382 A1.

Laser scanners are also used in safety technology for monitoring a danger source such as a hazardous machine represents. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Sensors used in safety technology have to work particularly reliably and must therefore satisfy high safety demands, for example the EN13849 standard for safety of machinery and the machinery standard EN1496 for electrosensitive protective equipment (ESPE).

While most conventional laser scanners work with a single scanning beam and accordingly only detect one central scanning plane, multi-plane scanners having a plurality of scanning beams with different elevation angles are also known. The more scanning beams are used in this process, the better the angular resolution becomes in the elevation direction or the better the total detectable elevation angle range. However, a large number of scanning beams also increase the thermal load and it is expensive and complex to install corresponding transmission and reception elements, above all in a compact design, for instance with accommodation on small electronic cards.

With a specific number of scanning beams that is as small as possible, a compromise thus has to be found between the detectable angular range and the angular resolution. With too low a density of the scanning planes, either the ability is lost to reliably detect small objects is lost in this process or it is no longer possible to measure anything at larger elevation angles.

In EP 2 863 176 A2, a rotating platform is disclosed on which different detection modules can rotate. In an embodiment, two scanning beams are generated that are offset by 180° in the direction of rotation. Flexible variants having a large number of scanning beams are not described. DE 10 2004 014 041 A1 deals with a sensor system for obstacle recognition in the manner of a laser scanner that uses a laser array and a row of photodiodes. The arrangement within the laser array and the array of photodiodes is fixed here. The described weighing up between detectable angular range and angular resolution is thus not overcome.

EP 1 936 400 A1 uses a pre-scanning beam to control the sensitivity for the actual measurement. This is not an actual multi-beam system since the pre-scanning beam does not contribute any full-featured measurement, but rather only serves for preparation. In addition, the angular offset of the pre-scanning is fixedly predefined.

EP 2 894 493 A1 shows a tilting mechanism for the rotating mirror of a laser scanner. The elevation angle thus admittedly becomes variable. However, it is only a single-beam system. In addition, the tilting is complex and sluggish; it is suitable for a continuous three-dimensional scanning, for example using a sinus curve in elevation, but not for flexible concepts.

EP 3 518 000 A1 deals with the most varied arrangements of scanning beams that are achieved by rotating and tilting multi-beam modules. They also include configurations in which the same scanning plane is detected multiple times by scanning beams disposed next to one another. The different settings through rotation and tilting are, however, only available in preparation or even in production and not dynamically during the measurement. The flexibility is moreover limited.

In US 2010/0020306 A1, a separate light transmitter and light receiver are provided for each scanning plane so that there is the option of adjusting every single scanning plane as desired. This is, however, a mechanical procedure before the actual measurement operation; there is no longer any flexibility afterward.

In the still unpublished European application having the file reference 19163505.1, a laser scanner having a pulse averaging process and a transmitter and receiver matrix is described. The individual measurements that contribute to a respective distance measurement of the pulse averaging process originate from different pairs of light sources and reception pixels, and indeed such that the same point is scanned multiple times despite the scan movement. The flexibility of a multi-beam laser scanner is, however, not increased in this manner.

There are also endeavors in the prior art to set up an area-scanning system without a rotating deflection unit (solid state scanner). Instead, the scanning beam is deflected by a change of electrical parameters of an optical element or microelement.

For example, the pulsed transmitted light of a light source is guided by an MEMS mirror in the X direction and in the Y direction over the surface to be scanned in EP 2 708 914 A1. The reflected light pulses are received by a SPAD (single photon avalanche diode) matrix of which only those SPADs are respectively activated that observe the region currently illuminated by the transmitted light beam. Other technologies are also proposed to implement the deflection movement without any rotating mechanical parts, for example a phased array based on liquid crystals in U.S. Pat. No. 5,151,814 or an optoacoustic modulator in U.S. Pat. No. 10,175,344 B2. In the still unpublished German patent application having the file reference 102018129972.9, a curvature of a receiver array is predefined by attachment to a standard or by means of a curvature device.

A LIDAR (light detection and ranging) system having a VCSEL (vertical cavity surface emitting laser) matrix as a light transmitter and a SPAD (single photon avalanche diode) matrix is known from US 2018/0279645 A1. There is a 1:1 association of the light transmitter element and the light reception element to respectively form a scanning beam. A change of the orientation of the scanning beams is not provided.

The advantage of the solid state technology is that no moving parts are required any longer. However, the scan range is very restricted, and indeed in the angle in the horizontal plane that a conventional laser scanner covers by its rotation by up to 360°.

It is therefore the object of the invention to provide a sensor of the category that can be used more flexibly.

This object is satisfied by an optoelectronic sensor and by a method for detecting objects in a monitored zone in accordance with the respective independent claim. A light transmitter generates at least one scanning beam in the sensor. A movable first deflection unit deflects the scanning beam in a first direction. The first movable deflection unit here performs a macroscopic movement; that is, it is a rotating mirror, movable scanning head, or the like for the typical horizontal scanning movement of a conventional laser scanner. The first direction is therefore the direction of rotation and varies the horizontal angle of rotation. A light receiver generates a received signal from the scanning beam returning after remission at an object. A control and evaluation unit detects objects using the received signal and in a time of flight process measures distances from the respectively scanned object points.

The invention starts from the basic idea of combining the classical platform having a movable first deflection unit with a second deflection unit of a solid state process. Solid state process means that the second deflection unit does not move, at most in the form of micromechanical movements of microelements. However, this in no way precludes the second deflection unit being moved as a whole by the first deflection unit; that would not be a movement generated by the second deflection unit.

A hybrid of a classical scanner and a solid state scanner is produced. The second deflection unit additionally moves the scanning beam, and indeed in the first direction and/or in a second direction transversely thereto. The rotational movement of the scanning beams predefined by the first deflection unit is thereby modified and/or is superposed with a movement in the elevation direction. The second deflection unit consequently provides that, in addition to the movement generated by the first deflection unit, the scanning rays also move with respect to a coordinate system also moved by this movement. The first direction or direction of rotation of the first deflection unit will also be called the X direction and the second direction or elevation direction will be called the Y direction later in the description of the Figures.

The invention has the advantage that advantages of both techniques are implemented by the combination of the classical scanning movement and the solid state process. The above-described compromise is in particular substantially simpler to find with multi-beam systems since the solid state process enables a flexible, dynamic adaptation to the current requirements. It is therefore no longer a priori necessary to make a good decision of dispensing either with a good angular resolution and thus the detection capability for small objects or a large detection angle also for objects in marginal regions. This applies to the elevation angle the solid state process covers and at the same time to the horizontal angle of rotation since the first deflection unit easily enables angular ranges of at least 180° and also 270° up to a full 360°. There is furthermore the possibility of implementing a leading movement or trailing movement of scanning beams, a dynamic object tracking, a discrete index scanning, and an avoidance of glare of the reception channel by use of the variable additional second deflection unit.

The second deflection unit preferably has a MEMS (micro-electromechanical system), DMD (digital micromirror device), OPA (optical phased array), LC (liquid crystal) or AOM (acoustooptical modulator) device. They are suitable solid state techniques to deflect the scanning beam without a macroscopic movement, i.e. either fully without moving parts or at most with moving microelements. A further preferred embodiment uses a liquid lens in which the boundary layer between two non-miscible media can be tilted by control of an electrode arrangement. Further alternatively, a scanning movement is emulated in that an active range on a light source array is shifted, for instance on a VSCEL array. The associated light receiver can also be an array arrangement or matrix arrangement, for example of SPADs (single photon avalanche diodes) in which only one pixel region corresponding to the active light sources is active. No received signals from light reception elements are generated or evaluated by the selective activation that cannot contribute to the useful signal. With a SPAD matrix as the light receiver, SPADs can be switched inactive in that the bias voltage is lowered below the breakdown voltage.

The second deflection unit is preferably arranged in a co-moving manner by the first deflection unit. The first deflection unit is for this purpose preferably designed as a movable scanning head in which the second deflection unit with the light transmitter and the light receiver rotates. It is, however, also conceivable to direct scanning beams onto a rotating mirror in different directions by the second deflection unit, but with the rotation of the rotating mirror then resulting in a rotation of the position of the scanning beam so that the scan grid resulting overall becomes very complex.

The light transmitter is preferably configured to generate a plurality of scanning beams and/or the light receiver has a plurality of light reception elements to generate a plurality of received signals from a plurality of scanning beams. A multi-beam system with movable scanning beams is produced in this manner. It must be noted that scanning beams are not to be understood as beams in the sense of ray optics within a larger light beam, but rather as light beams themselves with which a respective scan, that is a time of flight measurement at a scanning point, is carried out. A plurality of scanning beams can be generated by a plurality of light sources and/or beam splits, for example, in a grid generation element such as a diffractive optical element. The light receiver generates a received signal per scanning beam that is then evaluated. A plurality of discrete light reception elements and/or regions are preferably provided on a pixel-resolved light receiver for this purpose.

The second deflection unit is preferably configured to differently move a plurality of scanning beams individually or in groups. The deflection therefore acts individually on specific scanning beams. The measurement points of the scanning beams are thus freely selectable at least within the limits of the possible deflection and scanning regions can be defined particularly flexibly. It is conceivable that a plurality of scanning beams are coupled in their movement as a group, for example because microelements of the second deflection unit are only controllable in whole rows or columns or also in that an actuator on a carrier having a plurality of light sources variably curves differently.

The control and evaluation unit is preferably configured to move scanning beams toward or away from one another in the second direction. The distance between the scanning beams in elevation is thereby varied. This can be a static procedure to variably find a good compromise between angular resolution and the detected angular range for the current measurement situation. A continuous or multiple abrupt change can equally be dynamically carried out that also scans the elevation angle in superposition with the rotational movement. In both cases, the simultaneous detection possibility of small objects and a large covered spatial region with a use of only a few scanning beams can be better reconciled with one another.

The control and evaluation unit is preferably configured to set an angular grid of the scanning beams in the second direction more coarsely or more finely. In this case, the scanning beams form an angular grid, that is they are equally spaced apart from one another in the elevation direction. The second deflection unit varies this distance of the scanning beams between one another so that either a narrow angular segment is monitored by closely disposed scanning beams or a larger angular segment is monitored rather widely with more distance between the scanning beams.

The control and evaluation unit is preferably configured to move scanning beams toward one another in the first direction and/or in the second direction. The scanning beams are therefore inclined toward one another. This moving together preferably has the result that the scanning beams impact the same scanning point at a specifiable distance from the sensor or at least impact an environment that is smaller than the grid predefined by the rotation and measurement repetition rate in the direction of rotation of the first deflection unit. This effectively results in a multiple measurement at the same location or at a closely adjacent location.

The control and evaluation unit is preferably configured to allow a scanning beam to lead and/or trail in the first direction, in particular in a ramp from a maximum leading movement to a maximum trailing movement or vice versa. The measurements thus differ from the conventionally rigid angular grid predefined by the revolution rate and the measurement repetition rate. The second deflection unit acts in the direction of rotation of the first deflection unit to temporarily accelerate or decelerate its scanning movement. Both the only scanning beam of a mono-beam system and individual, multiple, or all the scanning beams of a multi-beam system can lead and/or trail in a common manner or in different manners. A uniform faster or slower scanning movement is regionally achieved with a ramp or a type of saw tooth of the leading or trailing movement. The angular grid is therefore sectionally spread or compressed, possibly while skipping specific angular ranges.

The control and evaluation unit is preferably configured to temporarily hold a scanning beam at a scanning point by a leading and/or trailing movement in the first direction. The second deflection unit for this purpose deflects the scanning beam in the first direction actually corresponding to the rotational speed of the first deflection unit, but with a reverse sign so that a so-to-say standing scanning beam is produced. The leading or trailing movement figuratively corresponds to an eye movement by which an object remains fixated despite a relative movement between an observer and the object. A movement in the second direction can be superposed, but the scanning beam preferably also remains fixed here.

The control and evaluation unit is preferably configured to measure a time of flight multiple times at the scanning point or at adjacent points that are more closely adjacent than an original angular resolution of a scan with the first deflection unit. The leading and trailing movement is therefore used to measure a specific scanning point or scanning region multiple times. A leading movement and a trailing movement is selected for this purpose by which the second deflection unit superposes a deflection in the first direction that is respectively directed to the specific scanning point.

The control and evaluation unit is preferably configured to scan an angular region of interest with improved angular resolution with respect to the first direction by a leading and/or trailing movement. In this manner, ROIs (regions of interest) are defined, for example in advance with reference to the application situation or dynamically, for instance because an object was detected here in an earlier revolution of the first deflection unit. The angular resolution is improved within the ROI due to the leading and/or trailing movement. These additional measurements are then lacking in an environment of the ROI, it is therefore accepted that the angular resolution deteriorates here or that angular ranges are possibly completely skipped.

The control and evaluation unit is preferably configured to evaluate received signals together that are generated by a plurality of scanning beams and/or in multiple measurements following one another in time to determine the distance from the object using a time of flight process. In other words, a pulse averaging process is used. The individual measurements of a plurality of scanning beams and/or a plurality of individual measurements performed after one another are statistically offset against one another to form a common measured value. The scanning beams in the first direction and/or in the second direction are here preferably moved together as proposed further above. A plurality of individual measurements thereby detect at least practically the same scanning point. If n individual measurements are to be summarized, the deflection unit in a conventional pulse averaging process has rotated onward n times so that the measurement is blurred over a certain angular range. Due to the moving together, m measurements can scan the same scanning point practically simultaneously so that measurement only takes place over an angular range reduced by the factor of m. When m=n, in particular only one scanning point is detected as in an individual pulse measurement or the angular range reduced by the factor of m is contracted by a leading and trailing movement to one scanning point.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

Figure 1:
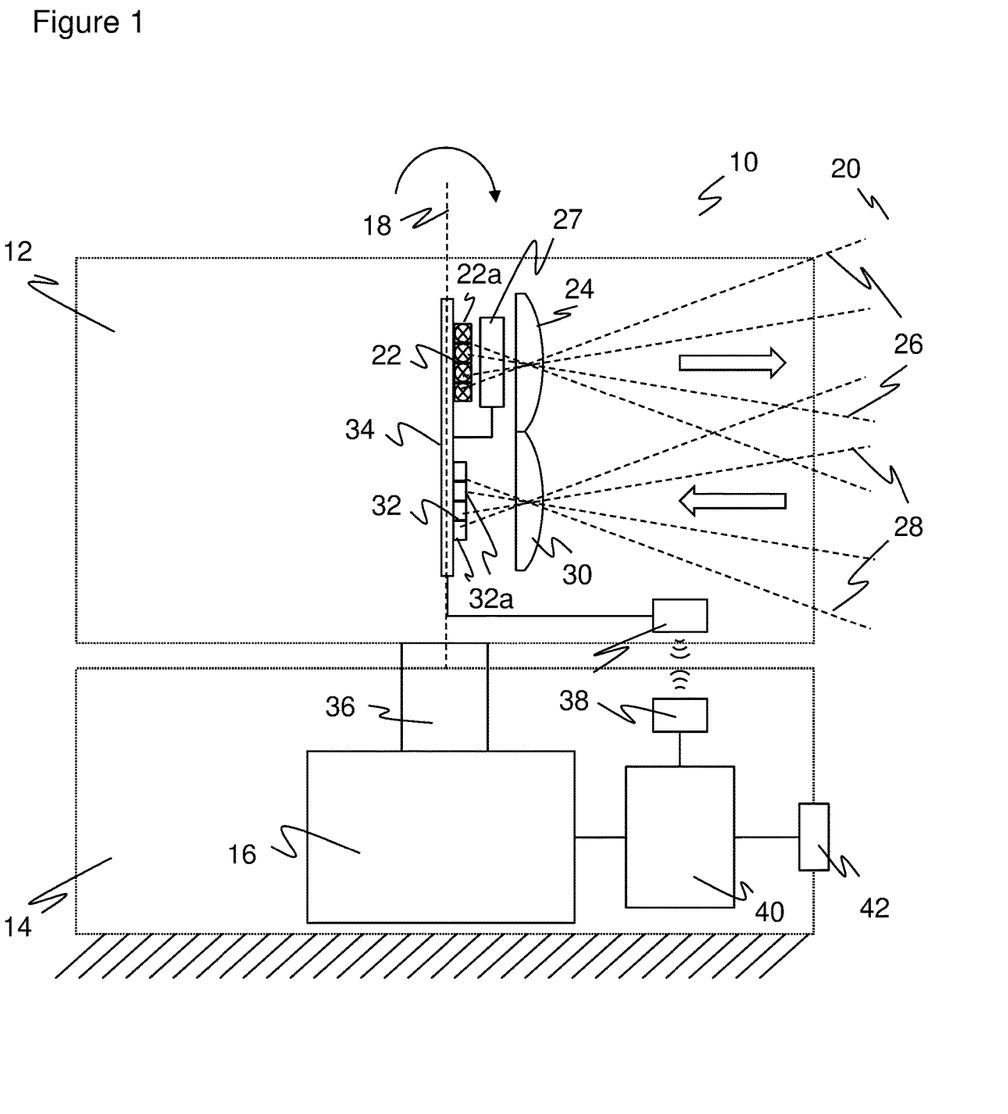
FIG. 1 a sectional representation of a laser scanner.

FIG. 1 shows a schematic sectional representation through an optoelectronic sensor 10 in an embodiment as a laser scanner. The sensor 10 in a rough distribution comprises a movable deflection unit 12 and a base unit 14. The deflection unit 12 is the optical measurement head, whereas further elements such as a supply, evaluation electronics, terminals, and the like are accommodated in the base unit 14. In operation, the deflection unit 12 is set into a movement about an axis of rotation 18 with the aid of a drive 16 of the base unit 14 to thus periodically scan a monitored zone 20.

In the first deflection unit 12, a light transmitter 22 having a plurality of light sources 22*a*, for example LEDs or lasers in the form of edge emitters or VCSELs, generates with the aid of a transmission optics 24 a plurality of scanning beams 26 that are transmitted into the monitored zone 20. In the example shown, there are four scanning beams 26 for four scanning planes; there can be more, also considerably more, and, equally, fewer scanning beams 26. The case of an individual beam system having only one scanning beam 26 is also conceivable. It must additionally be noted that is a sectional view. The light transmitter 22 is therefore shown as a column; in fact, further light sources 22*a* are preferably present in a direction perpendicular to the plane of the paper. Individual optics are possible instead of a common transmission optics 24. The plurality of scanning beams 26 can also be produced in that the light of a light source or of some light sources is split by a beam splitter element, a diffractive optical element, or the like.

A second deflection 27 is arranged between the light transmitter 22 and the transmission optics 24. Alternatively, the transmission optics 24 and the second deflection unit 27 can also be swapped over. It is furthermore conceivable that at least parts of the transmission optics 24 are formed together with the second deflection unit 27, for example beam-shaping optical microoptical elements such as microlenses, of the second deflection unit 27 in combination with one or more larger transmission lenses. The second deflection unit 27 is configured to deflect the scanning beams again by a solid state process individually, in groups, or together in addition to the deflection by the first deflection unit 12. Solid state process means that the second deflection unit does not have any macroscopically moved parts like the first deflection unit 12, but rather acts only by an electrical control or at most by movable microelements. Examples for solid state techniques are a MEMS (micro-electromechanical system), DMD (digital micromirror device), OPA (optical phased array), LC (liquid crystal) or AOM (acoustooptical modulator). A tiltable liquid lens of the transmission optics 24 is also conceivable.

If the scanning beams 26 impact an object in the monitored zone 20, corresponding remitted scanning beams 28 return to the sensor 10. The remitted light beams 28 are conducted by a reception optics 30 to a light receiver 32 having a plurality of light receiver elements 32*a* that each generate an electric received signal. The light reception elements 32*a* can be separate elements or pixels of an integrated matrix arrangement, for example photodiodes, APDs (avalanche diodes), or SPADs (single photon avalanche diodes), with preferably only pixel regions corresponding to the scanning beams 26, 28 being activated or read. The remarks on the transmission side also apply accordingly here. There are therefore possibly a plurality of light reception elements 32*a* in a direction perpendicular to the plane of the paper; a plurality of single optics or multi-part objectives can be provided as the reception optics 30, and a plurality or all of the remitted scanning beams 28 can be detected on a common light reception element where they are separated from one another by time multiplexing or frequency multiplexing, for example. The second deflection unit 27 only acting at the transmission side in FIG. 1 could also act at the reception side or a further deflection unit can be provided as a part of the second deflection unit 27 at the reception side.

The light transmitter 22 and the light receiver 32 are arranged together in this embodiment on a circuit board 34 that is disposed on the axis of rotation 18 and that is connected to the shaft 36 of the drive 16. This is only to be understood by way of example; practically any desired numbers and arrangements of circuit boards are conceivable. The basic optical design with light transmitters 22 and light receivers 32 disposed biaxially next to one another is also not compulsory and can be replaced with any construction design known per se of single-beam optoelectronic sensors or laser scanners. An example for this is a coaxial arrangement with or without beam splitters.

A contactless supply and data interface 38 connects the moving deflection unit 12 to the stationary base unit 14. A control and evaluation unit 40 is located there that can at least partly also be accommodated on the circuit board 34 or at another site in the first deflection unit 12. It is in particular conceivable to already accommodate some of the evaluation in the light receiver 32, for instance by an ASIC (application specific integrated circuit) design, with individual cells being immediately digitally evaluated and further processed. The control and evaluation unit 40 controls the light transmitter 22 and receives the received signals of the light receiver 32 for a further evaluation. It additionally controls the drive 16 and receives the signal of an angle measurement unit which is not shown, which is generally known from laser scanners, and which determines the respective angular position of the deflection unit 12.

The distance from a scanned object is measured in a time of flight process for the evaluation. A respective scanning point or measurement point is acquired in three-dimensional coordinates together with the information on the angular position of the first deflection unit 12 from the angle measurement unit, the identity of the respective scanning beam 26, 28, and the additional deflection by the second deflection unit. Which three-dimensional spatial zone is specifically detected overall is decided by the respective type of deflection of the second deflection unit 27 that will be explained more exactly below with reference to FIGS. 2 to 7.

The object positions or object contours are thus known and can be output via a sensor interface 42. The sensor interface 42 or a further terminal, not shown, conversely serves as a parameterization interface. The sensor 10 can also be configured as a safety sensor for use in safety engineering for monitoring a hazard source, as briefly presented in the introduction. Alternatively to a rotating measurement head as a first deflection unit 12, a periodic deflection by means of a rotating mirror or a facet mirror wheel is also conceivable.

A respective surface is scanned by each of the scanning beams 26 at a fixed elevation angle during the movement of the first deflection unit 12. A scanning plane of the monitored zone 20 is here only scanned at an elevation angle of 0°, that is with a horizontal scanning beam not present in FIG. 1. Scanning beams 26 having a finite elevation scan the jacket surface of a cone that is configured as differently tapered depending on the elevation angle. With a plurality of scanning beams 26 that are deflected upward and downward at different angles, a kind of nesting of a plurality of hourglasses arises overall as a scanned structure. These surfaces are here also called scanning planes in simplified terms. Huge differences from the described hourglasses are indeed produced by the additional deflection of the second deflection unit 27.

Figure 2:
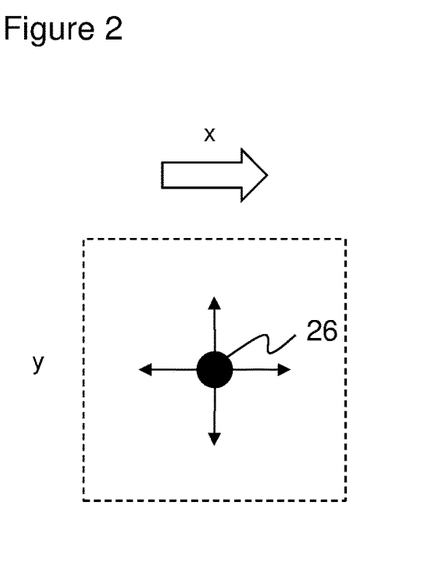
FIG. 2 a frontal view of an individually movable scanning beam.

FIG. 2 shows a frontal view of a scanning beam 26 that therefore extends out of the plane of the paper and can be seen in cross-section. The possible deflections of the scanning beam 26 by the second deflection unit 27 are shown by four direction arrows. The second deflection unit 27 provides a deflection in an X direction and in a Y direction. The X direction is that direction in which the first deflection unit 12 moves. Its underlying rotational movement is shown by a block arrow. The X direction is only a Cartesian coordinate locally, at a fixed point in time; strictly speaking this direction changes constantly and would have to be described by the angle in the direction of rotation. A deflection of the second deflection unit 27 in the X direction increases or decreases the deflection of the first deflection unit 12. The Y direction is the direction perpendicular thereto, simultaneously in parallel with the axis of rotation. A deflection of the second deflection unit 27 in the Y direction changes the elevation angle of the scanning beam 26.

The individual scanning beam 26 of FIG. 2 corresponds to a mono-beam system whose only scanning beam 26 can additionally be deflected variably in the X direction and/or Y direction by means of the second deflection unit 27. It is conceivable in this respect that the second deflection unit is restricted; for example, can only deflect in the Y direction. The angular range of a deflection by a solid state process is limited, which is symbolized by the dashed surrounding rectangle. Due to the additional deflection of the second deflection unit, instead of a central scanning plane as with a conventional laser scanner, a plane having a specific elevation, a leading or trailing movement with respect to the underlying rotational movement of the first scanning unit 12 and generally a variable scanning grid can be scanned in a three-dimensional space.

Figure 3:
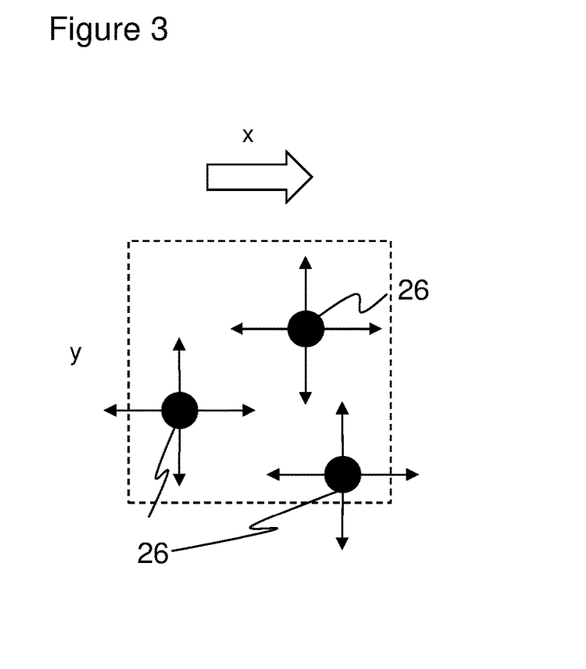
FIG. 3 a frontal view of a plurality of individually movable scanning beams.

FIG. 3 shows a frontal view corresponding to FIG. 2, but now of a plurality of scanning beams 26 of a multi-beam system. The explanations on the individual scanning beam 26 of FIG. 2 apply to the deflection possibilities of the individual scanning beams 26. Depending on the embodiment, the second deflection unit 27 can deflect the scanning beams 26 individually and independently of one another, or there is a partial or complete coupling between groups of scanning beams 26 or even all the scanning beams.

Figure 4:
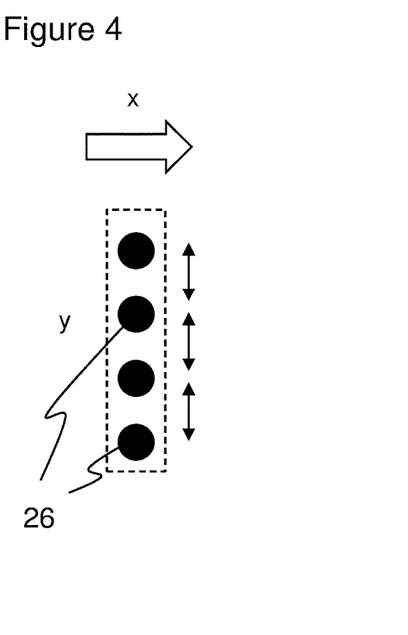
FIG. 4 a frontal view of a plurality of scanning beams arranged to form a column with a variable mutual vertical distance.
Figure 5:
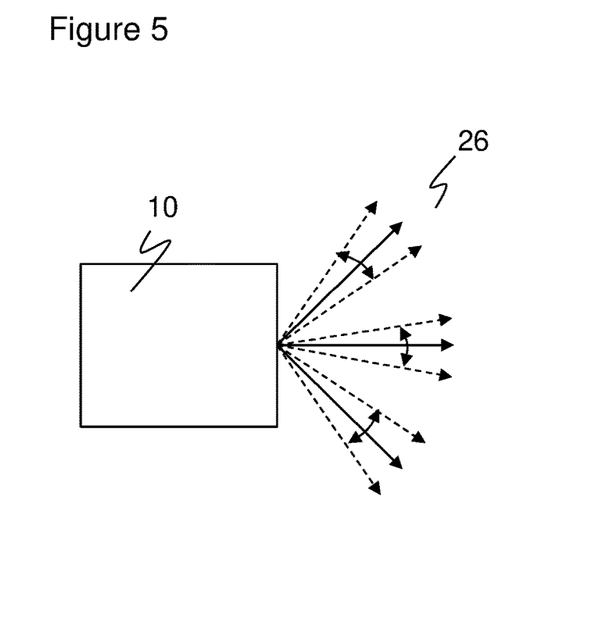
FIG. 5 a side view of a laser scanner having with the scanning beams in accordance with FIG. 4.

FIGS. 4 and 5 illustrate an application example with a variation of the scanning beams 26 only in the Y direction, that is in elevation. A deflection could equally be superposed in the X direction, in particular a leading or trailing movement. FIG. 4 is a frontal view corresponding to FIGS. 2 and 3 of, purely by way of example, four scanning beams 26 that are disposed above one another in the Y direction. The spacing between the four scanning beams 26 is variable by means of the second deflection unit 27.

It is not necessary that the scanning beams 26 have a uniform distance from one another. On the one hand, it can be only a state of rest from which a deviation is made during the deflections by the second deflection unit 27. It can, however, moreover be advantageous not to aim for a uniform angular grid in elevation from the start. There can, for example, be an outer scanning beam 26 at a large elevation angle distance to there acquire at least one rough piece of information on objects that are present, while more exact object information is detected with a finer angular grid for elevation angles at close to the horizontal.

FIG. 5 shows a corresponding side view of the sensor 10 only shown as a schematic block and of the scanning beams 26. The pushing together and apart of the scanning beams in accordance with FIG. 4 by a variation of the deflection of the second deflection unit 27 in the Y direction produces a variation in the elevation angle. This adjustment can be static to set a specific elevation angle distance between the scanning beams 26. Alternatively, the scanning beams 26 are pivoted dynamically in the direction of elevation, and indeed preferably each one in one of a plurality of mutually complementing elevation angle ranges. A further scanning procedure in the Y direction by the second deflection unit 27 is thereby superposed on the scanning procedure in the X direction by the first deflection unit 12. A few scanning beams 26 are therefore sufficient to scan the space for which previously a plurality of scanning beams were necessary for a sufficiently close-meshed angular grid. There is also a gain in the static case because the available, then rigid, angular grid can be ideally adapted to the current demands.

Figure 6:
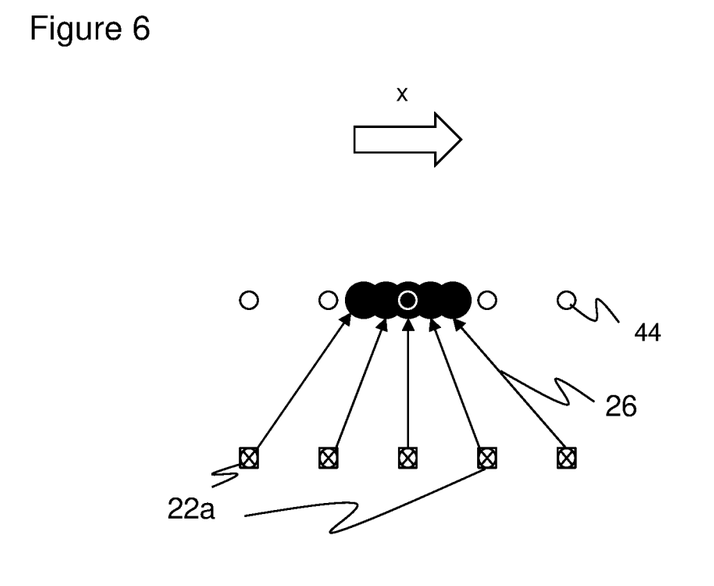
FIG. 6 a frontal view of a scanning beam in a plurality of scans having a leading and a trailing movement following one another.
Figure 7:
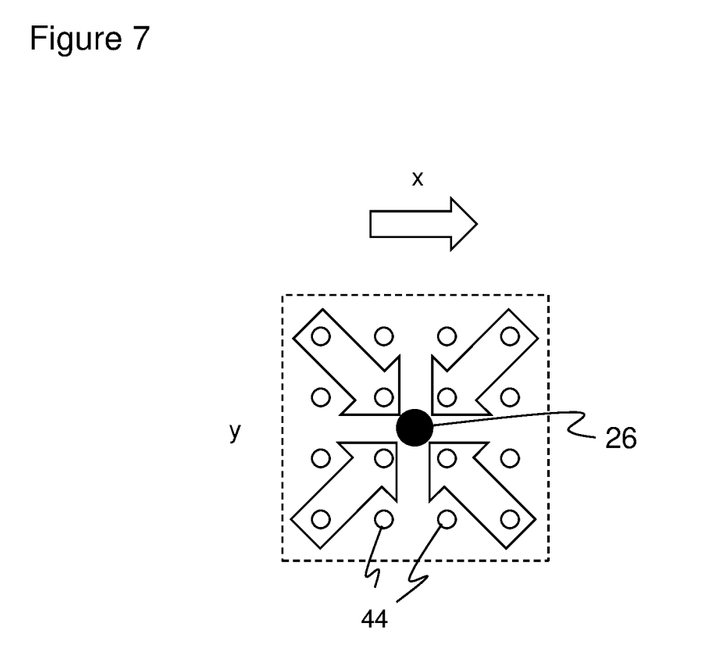
FIG. 7 a frontal view of a plurality of scanning beams. moved toward one another.

FIG. 6 illustrates a leading and trailing movement respectively in a further frontal view of a scanning beam 26. This is a deflection only in the X direction that can be provided in isolation or in combination with a deflection in the Y direction. The sensor 10 in the base state measures without the superposed deflection of the second deflection unit 27 during the rotational movement of the first deflection unit 12 at measurement points that are disposed at a uniform angular grid 44 given by the measurement repetition rate. Leading or trailing means that a deviation is made from this angular grid 44 by an additional deflection of the second deflection unit 27 in the X direction.

Measurements can be concentrated in specific measurement ranges by a leading and/or trailing movement, which has to be compensated by less concentrated measurements or by measurement gaps in other angular ranges. Regions of interest (ROIs) can thereby be defined in which a measurement is made at a higher angular resolution. This can be a static determination for a longer application time period. An example would be a laser scanner at a vehicle in which measurement information in the direction of travel is as a rule more important than lateral measurement information. A further, now dynamic, example is an object tracking. A region of interest is then defined where an object was detected in an earlier scan or where it is now expected on extrapolation of the previous movement. It must, however, be noted that the leading and trailing is only possible over a limited overall angle since the second deflection unit 27 is limited to a specific angular range by its solid state procedure.

It is specifically possible by a leading or trailing movement to stop the scanning for a plurality of measurements at, so-to-say, one scanning point. For this purpose, for example, the second deflection unit 27 carries out a movement in the X direction in the opposite sense to the first deflection unit 12 in a type of ramp or saw tooth. This example is illustrated in FIG. 6. Light sources 26a are shown in the lower region. They are either a plurality of physical light sources 26a or the starting points of a plurality of scanning beams 26 after a beam splitting or it symbolizes the same scanning beam 26 at sequential time points. In the base state, a scanning point would be scanned in the angular grid 44, i.e. the shown scanning beams 26 would have to be drawn perpendicular. Instead, the scanning beams 26 are inclined toward the common scanning point, however. Scanning beams 26 leading in the X direction look back; trailing scanning beams look forward. A common scanning point is thereby fixed, with this, as shown in FIG. 6, not having to be a perfect superposition. The angular range of the leading and trailing scanning beams 26 is at least smaller than the portion of the angular grid 44 belonging to the scanning beams 26. Specific points and in particular small objects can thus be held longer in the field of view, similar to the function of the eye.

FIG. 7 again shows a frontal view of a plurality of scanning beams 26 that are now arranged in a matrix grid. In this embodiment, the second deflection unit is used to move the scanning beams 26 closer together in the X and Y directions. The matrix can also be produced by only one column of scanning beams 26 that is then observed in FIG. 7 superposed for a plurality of sequential measurements. The moving together in the X direction then corresponds to the leading and trailing explained with reference to FIG. 6.

The moving together can be advantageous to acquire additional measurement information from a specific scanning point or scanning range. This is in particular of interest in a pulse averaging process so that the individual measurements, that each contribute to a distance value, take place at at least largely the same object point under conditions that are the same as possible. It is not necessary that a moving together to a center takes place as in FIG. 7; this can equally take place at a marginal or corner point.

The invention claimed is:

1. An optoelectronic sensor for detecting objects in a monitored zone, the optoelectronic sensor comprising:
    a light transmitter for transmitting at least one scanning beam;
    a movable first deflection unit for a periodic deflection of the at least one scanning beam in a first direction;
    a light receiver for generating a received signal from the at least one scanning beam reflected by objects in the monitored zone;
    a control and evaluation unit that is configured to evaluate the received signal to determine a distance from an object scanned by the at least one scanning beam using a time of flight process; and
    a second deflection unit that is configured to additionally deflect the at least one scanning beam in the first direction and/or in a second direction transverse to the first direction without a movement or at most with micromechanically moved elements,
    wherein the control and evaluation unit is further configured to allow the at least one scanning beam to lead and/or trail in the first direction with respect to an angular rate defined by the periodic deflection of the at least one scanning beam.

2. The optoelectronic sensor in accordance with claim 1, wherein the optoelectronic sensor comprises a laser scanner.

3. The optoelectronic sensor in accordance with claim 1, wherein the second deflection unit has one of a MEMS device, a DMD device, an OPA device, an LC device, an AOM device and a tiltable liquid lens.

4. The optoelectronic sensor in accordance with claim 1, wherein the second deflection unit is arranged co-moved by the first deflection unit.

5. The optoelectronic sensor in accordance with claim 1, wherein the light transmitter is configured to generate a plurality of scanning beams and/or the light receiver has a plurality of light reception elements to generate a plurality of received signals from a plurality of scanning beams.

6. The optoelectronic sensor in accordance with claim 5, wherein the second deflection unit is configured to differently move a plurality of scanning beams individually or in groups.

7. The optoelectronic sensor in accordance with claim 5, wherein the control and evaluation unit is configured to move the plurality of scanning beams toward or away from one another in the second direction.

8. The optoelectronic sensor in accordance with claim 5, wherein the control and evaluation unit is configured to set an angular grid of the scanning beams more coarsely or more finely in the second direction.

9. The optoelectronic sensor in accordance with claim 5, wherein the control and evaluation unit is configured to move the plurality of scanning beams together in the first direction and/or in the second direction.

10. The optoelectronic sensor in accordance with claim 1, wherein the control and evaluation unit is configured to allow the at least one scanning beam to lead and/or trail in the first direction in a ramp from a maximum leading movement to a maximum trailing movement or vice versa.

11. The optoelectronic sensor in accordance with claim 1, wherein the control and evaluation unit is configured to temporarily fix the at least one scanning beam at a scanning point by a leading and/or trailing movement in the first direction.

12. The optoelectronic sensor in accordance with claim 11, wherein the control and evaluation unit is configured to measure a time of flight multiple times at the scanning point or at adjacent points that are more closely adjacent than an original angular resolution of a scan with the first deflection unit.

13. The optoelectronic sensor in accordance with claim 1, wherein the control and evaluation unit is configured to scan an angular region of interest with improved angular resolution with respect to the first direction by a leading and/or trailing movement.

14. The optoelectronic sensor in accordance with claim 1, wherein the control and evaluation unit is configured to evaluate multiple received signals together that are generated by a plurality of scanning beams and/or in multiple measurements following one another in time to determine the distance from the object using a time of flight process.

15. A method of detecting objects in a monitored zone in which at least one scanning beam is transmitted, comprising:
    periodically deflecting the at least one scanning beam in a first direction by means of a movable first deflection unit;
    generating a received signal from the at least one scanning beam reflected remitted by objects in the monitored zone;

evaluating the received signal to determine a distance from an object scanned by the at least one scanning beam by a time of flight process; and additionally deflecting the at least one scanning beam in the first direction and/or in a second direction transverse to the first direction without a movement or at most with micromechanically moved elements, wherein the at least one scanning beam selectively leads and/or trails in the first direction with respect to an angular rate defined by the periodic deflection of the at least one scanning beam.

16. The optoelectronic sensor in accordance with claim 1, wherein the first direction comprises an azimuthal direction.

17. The method of detecting objects in a monitored zone in accordance with claim 15, wherein the first direction comprises an azimuthal direction.

\* \* \* \* \*